United States Patent
Johanson et al.

(10) Patent No.: US 7,814,433 B2
(45) Date of Patent: Oct. 12, 2010

(54) HETEROGENEOUS CONTENT CHANNEL MANAGER FOR UBIQUITOUS COMPUTER SOFTWARE SYSTEMS

(75) Inventors: Bradley E. Johanson, Palo Alto, CA (US); Andrew J. Milne, Palo Alto, CA (US); Michael Eggers, Oakland, CA (US); Armando Fox, San Francisco, CA (US)

(73) Assignee: Tidebreak, Inc., Palo Alto, CA (US)

( * ) Notice: Subject to any disclaimer, the term of this patent is extended or adjusted under 35 U.S.C. 154(b) by 453 days.

(21) Appl. No.: 11/390,554

(22) Filed: Mar. 24, 2006

(65) Prior Publication Data

US 2006/0242584 A1    Oct. 26, 2006

Related U.S. Application Data

(60) Provisional application No. 60/665,281, filed on Mar. 25, 2005.

(51) Int. Cl.
*G06F 3/48* (2006.01)
*G06F 3/00* (2006.01)
*G06F 17/00* (2006.01)
*G09G 5/00* (2006.01)
*G05B 15/00* (2006.01)

(52) U.S. Cl. ............ 715/810; 715/738; 715/740; 715/817; 715/708; 715/714; 715/700; 715/238; 345/156; 345/338; 700/1

(58) Field of Classification Search ............ 715/738, 715/740, 817, 708, 714, 238, 700, 810; 700/1; 345/156, 338; 709/229
See application file for complete search history.

(56) References Cited

U.S. PATENT DOCUMENTS

| 5,819,038 | A | * | 10/1998 | Carleton et al. | 709/204 |
|---|---|---|---|---|---|
| 6,141,003 | A | * | 10/2000 | Chor et al. | 715/719 |
| 6,628,302 | B2 | | 9/2003 | White et al. | |
| 6,901,441 | B2 | * | 5/2005 | Bent et al. | 709/223 |
| 2002/0158900 | A1 | * | 10/2002 | Hsieh et al. | 345/738 |
| 2004/0243663 | A1 | * | 12/2004 | Johanson et al. | 709/200 |
| 2005/0249169 | A1 | * | 11/2005 | Fong | 370/338 |

OTHER PUBLICATIONS

Tan, Desney S. et al "WinCuts: Manipulation Arbitrary Window Regions for More Effective Use of Screen Space." (2004) Proceedings, Conference on Human Factors in Computing Systems.
Chiu, Patrick et al. "NoteLook: Taking Notes in Meetings with Digital Video and Ink" (1999) Proceedings, ACM, Multimedia.
"SynchronEyes Classroom Management Software", pp. 1-2, 2006.
"SynchronEyes Classroom Mangement Software", pp. 1-3, 2006.

* cited by examiner

*Primary Examiner*—William L Bashore
*Assistant Examiner*—Ece Hur
(74) *Attorney, Agent, or Firm*—Lumen Patent Firm

(57) ABSTRACT

A heterogeneous content channel manager is provided for content management and collaboration within and across interactive workspaces. A content channel bar, available on each of the displays in the workspace(s), contains two or more unique representations of respectively two or more different channels available in the interactive workspace(s). Within the set of available channels on each channel bar two or more different channel types are represented. Furthermore, each one of the unique representations in the content channel bar represents different and unique content supported by their respective channels and their types. Channel selection on the channel bar initiates display, on the display where the channel selection was made, of the content represented by the selected representation and channel in a manner appropriate for the channel's type.

13 Claims, 4 Drawing Sheets

HETEROGENEOUS CONTENT CHANNEL MANAGER FOR UBIQUITOUS COMPUTER SOFTWARE SYSTEMS

CROSS-REFERENCE TO RELATED APPLICATIONS

This application is cross-referenced to and claims the benefit from U.S. Provisional Patent Application 60/665,281 filed Mar. 25, 2005, which is hereby incorporated by reference.

FIELD OF THE INVENTION

This invention relates generally to interactive workspaces. More particularly, the invention relates to a system and method for managing heterogeneous content channels across screens, displays, monitors, and the like driven by different machines and operating systems located in and/or connected to one or more interactive workspaces.

BACKGROUND

A thumbnail view is a small image on a computer desktop that represents something, for example, a program or device that can be selected or activated by a mouse click. A desktop thumbnail view is typically linked with an application running on a single machine. Thumbnail views may also be correlated with one another within a single application. For instance, many photo viewers allow clicking on one of the thumbnail views in a region to trigger the display of a bigger version thereof. Microsoft® PowerPoint® has an edit mode with thumbnails on one side of the screen that can be used to select the slide being displayed in the main edit region. In multi-head mode, a thumbnail browser on a private screen enables a user to select what slide to display on the main screen.

Many electronic whiteboard systems such as eBeam®, SmartBoard®, etc. also use thumbnails to allow users to create new blank screens on which they can draw or to switch back to previous drawings. Systems such as Classroom 2000 or NoteLook allow one or more users with personal devices to add their own annotations to material presented during a meeting, and in some cases share those notes, see, e.g., Desney S. Tan, B. Meyers, and M. Czerwinski, 2004, "Win-Cuts: manipulating arbitrary window regions for more effective use of screen space," Proceedings, Conference on Human Factors in Computing Systems, Vienna, Austria, Apr. 24-29, 2004; and Chiu, P., A. Kapuskar, S. Reitmeier, and L. Wilcox "NoteLook: Taking Notes in Meetings with Digital Video and Ink," Proceedings, ACM Multimedia '99, Orlando, Fla.

A common thread in these prior systems is the use of thumbnail viewers as a means to select display content within the same program or software system. None of them enables a user to manage, in a comprehensive yet easy to use fashion, heterogeneous content across screens, displays, monitors, etc. driven by different machines and operating systems located in and/or connected to one or more interactive workspaces such as a meeting room or set of meeting rooms. As application sharing between networked machines becomes more common, so does the need to easily switch between all types of content being displayed thereon. The present invention addresses this need.

SUMMARY OF THE INVENTION

The present invention provides mechanisms for presenting and interacting with content, devices of different types, and people during co-located or distributed sessions or meetings taking place in one or more meeting locations (i.e. interactive workspace(s)), where each meeting location has one or more visual display or other output systems. The mechanisms are designed to be intuitive and minimize the interruption of conversation or workflow. The primary interaction mode of the mechanisms is a content channel bar or organizer populated by unique "thumbnail" channel representations accessible from any enabled device at any of the locations participating in the session or meeting.

Content channels are defined as sources or types of information supported by a source that is some form of electronic computing, sensing, or peripheral device, for example, a video conferencing feed, and some form of perceivable output system, for example, a video display monitor or audio speakers. The content channel bar contains a thumbnail for each instance of content, device, and even a person involved in a meeting.

In general, a content channel bar contains two or more unique representations (i.e. thumbnails) of respectively two or more different channels available in the interactive workspace(s). Within the set of available channels on each content channel bar two or more different channel types are represented. Furthermore, each one of the unique representations in the content channel bar represents different and unique content supported by its' respective channel and its' type.

Each thumbnail is annotated with icons, text or other symbols to provide meta-information. Thumbnails include, but are not limited to, a static representative graphic, an updating indicator that shows the current state for the entity, and a real-time view of the dynamic content to which it corresponds. Thumbnails may also include some additional form of perceptual information, e.g. audio content, that communicates aspects of the state of the channel and its content. The term "display" herein shall collectively refer to any form of perceptual—i.e. visual, audible, or tactile—information associated with a content channel.

For available content, a user can select a thumbnail in the channel bar by using some form of input device (for example, a computer mouse, a tangible interface including gesture detector, a computer touchpad, a tablet PC, or a touch screen interface), by issuing an audible command, or by otherwise indicating a thumbnail using a software-generated event that is passed to the interface. Selecting a thumbnail from the channel bar shown on a particular display system causes that display to show the content represented by the thumbnail in an alternate view and in a manner appropriate for the channel's type.

Each thumbnail can also serve as a drop-target for drag-and-drop actions. Dragging a file or other object to a thumbnail for a remote device, for example, will open that file on that machine. Dragging a file to the icon for a meeting participant will perform some user specified action such as emailing the participant a copy of the file or object. Dragging an image onto an electronic whiteboard document will insert the image as an object in that drawing. In general, dragging an item to a thumbnail will perform a content channel specific action appropriate to the combination of the dragged item and the type and configuration of the content channel to which it is dragged.

The content channel bar/organizer system described herein manages the presentation of channels, the flow of content across channels, and the secure access to channels. It provides links to external software assistants to enable channel-related capabilities, support user awareness of meta-information related to channels, and allow user customization of channel representations.

As one skilled in the art will appreciate, most digital computer systems can be programmed to implement the heterogeneous digital content channel organizer described herein. To the extent that a particular computer system is configured to implement the content channel organizer, it becomes a digital computer system within the scope and spirit of the present invention. That is, once a digital computer system is programmed to perform particular functions pursuant to computer-executable instructions from program software that implements the content channel organizer, it in effect becomes a special purpose computer particular to the present invention. The necessary programming-related techniques are well known to those skilled in the art and thus are not further described herein.

Computer programs implementing the present invention can be distributed to users on a computer-readable medium, such as floppy disk, memory module, or CD-ROM, and are often downloaded or copied onto a hard disk or other storage medium. When such a program of instructions is to be executed, it is usually loaded from the distribution medium, the remote server, the hard disk, or other storage medium into the random access memory of the computer, thereby configuring the computer to act in accordance with the inventive method disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the invention disclosed herein.

DESCRIPTION OF THE FIGURES

The objectives and advantages of the present invention will be understood by reading the following detailed description in conjunction with the drawings, in which.

Figure 1:
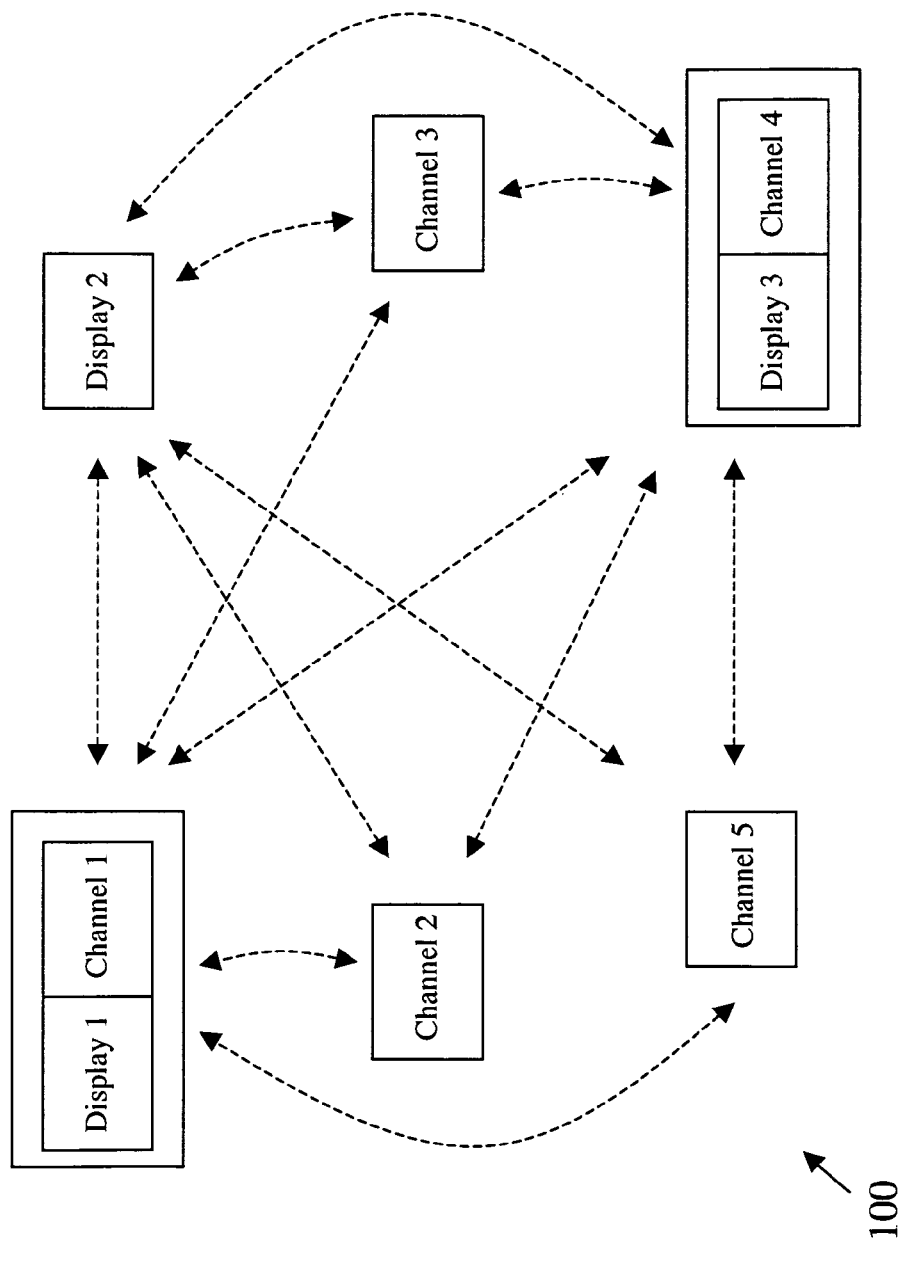
FIG. 1 shows an example of an interactive workspace 100, according to the present invention, characterized by multiple users (not shown), multiple independent visual displays (three displays shown), a plurality of different channel (five channels shown) each having one of a plurality of different channel types, a network (shown by dashed lines) connecting the multiple independent visual displays and the plurality of different channels. Each channel represents some static or dynamic content in the interactive workspace, which corresponds with the channel's type. It is noted that channels can be either operatively connected to a display (e.g. Display 1 and Channel 1) or stand-alone (e.g. Channel 2). In case of a stand-alone channel one could have a whiteboard capture device for a physical whiteboard that only connects to the rest of the interactive workspace by a network connection. In other words, that channel is not necessarily operatively connected to any specific display. It is further noted that some of the channels are references to content shown on a specific display. Here selecting one of these channels will cause the display on which the selection was made to continuously update itself to show the channel being shown on the display being referenced by the channel selected. Further, should the referenced display itself be showing a channel referencing yet another display, dereferencing automatically proceeds through such display reference channels in a recursive fashion until a channel representing a native source is found to be shown on the display on which the selection was made. This concept is called channel following and comes into play when a user selects as the channel for local display whatever is on some other display. For example, on display 1, the user selects the channel to be display 2. In this case, display 1 now needs to display whatever is on display 2. If display 2 is just showing the desktop of its attached computer, e.g. channel 3, display 1 will show a remote desktop view of that computer. If somebody switches display 2's channel to show a remote whiteboard, e.g. channel 5, display 1 should also switch to display that remote whiteboard, channel 5. If somebody connects their laptop for display on display 2, display 1 should begin showing the remote desktop of that laptop. This can also be recursive. If display 2 is switched to display 3, display 1 should now display the channel showing on display 3.
Figure 2:
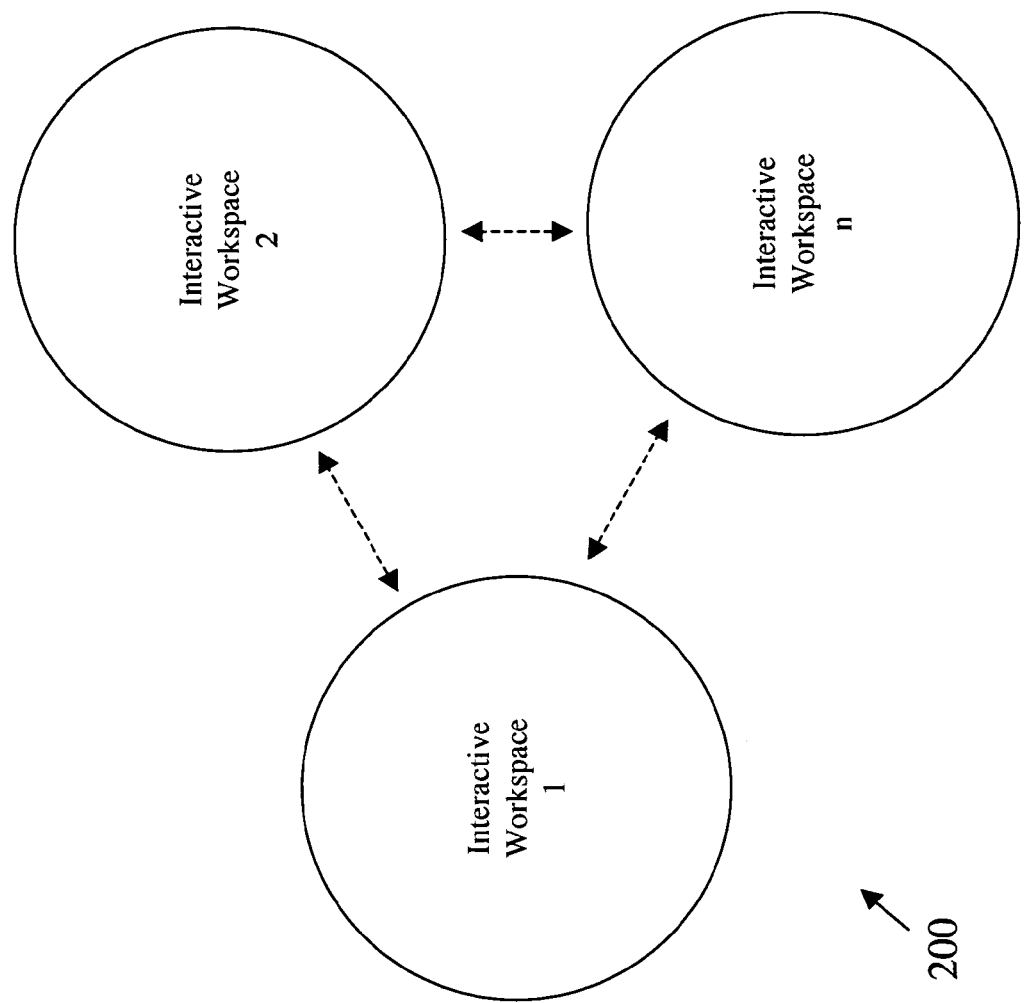
FIG. 2 shows an example 200 of a plurality of networked (shown by dashed lines) interactive workspaces, according to the present invention, whereby each interactive workspace, 1, 2, . . . n, is characterized similar to the interactive workspace described with respect to FIG. 1. This scenario provides mechanisms for displays in one interactive workspace to display screens or contents from a remote interactive workspace when two or more interactive workspaces are connected to one another for a remote collaboration session. In this case, the channel bar in one room will display native channels, including remote desktops, that are both local and/or in one of the remote interactive workspaces. In this case, also, users in any given interactive workspace and for any given channel type, may choose to make that channel only available locally, or only available to some sub-group of the interconnected interactive workspaces.

The vertical bar 320 is a means of accessing other features of the software besides the content channel bar. Each feature has its own "blade", the only one of which is showing in the image is the channel bar. Starting at the bottom, the items are: (320A) general utilities (meeting timers, world clocks, etc.), (320B) channel bar with its blade shown, (320C) meeting bin (files available to all participants in the meeting), and (320D) participants (shows other meeting participants and enables Instant Messaging to them). The final item (320E) at the top is not a blade, but can be clicked to "raise your hand" and notify others in the meeting that you would like to interrupt or say something. In this case, the participant's icon on all the other controllers could turn to a particular color and a message briefly could appear indicating who raised their hand.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention.

Accordingly, the following preferred embodiment of the invention is set forth without any loss of generality to, and without imposing limitations upon, the claimed invention.

1. Channel Content Presentation

A variety of different content channel types can be supported by the system, including, but not limited to, the video display of digital devices, graphical representations of captured physical activities, active windows driven by software applications, or content streams provided by specialized devices. The channel organizer allows users to access and interact with any of these content channels in ways that are appropriate to the content and context of the channel. In general the channel content bar contains at least two different channels each having one of a plurality of different channel types.

The channel organizer allows the native video display associated with any of these devices (a "Receiver") to be linked to the display of another device such that it mirrors, i.e. copies, the content of the second device (the "Source"). Thus, multiple Receiver devices can mirror a single Source device simultaneously or mirror multiple Source devices simultaneously. The content channel organizer includes the option to display the native content display of a device when it is not mirroring another.

The system provides the option to "lock" a particular device display from one or more locations to the content displayed on a Source. This lock may be initiated manually, in response to a software-initiated event, or it may be pre-configured. For example, the lock could initiate when two or more locations are linked together for a joint meeting session.

When a Receiver device is "locked" to a primary Source device that switches itself to mirror a secondary Source, the Receiver maintains its correspondence to the primary Source, but will redirect itself to access the content of the secondary Source directly while the primary Source is mirroring it. Once the primary Source reverts back to its own content, the Receiver reverts to the primary Source. This mechanism functions for multiple levels of indirection, i.e. in situations where successive Source devices mirror other Source devices.

By selecting a thumbnail in the channel organizer, one or more Source content channels could be directed to one or more Receiver devices. One scheme for this involves dragging a thumbnail representation of a Source and dropping it on a thumbnail representing a Receiver display in a system geometry model. Another scheme involves dragging the thumbnail for the Source in conjunction with a pointer redirection system, e.g., the PointRight™ system, and releasing it while the pointer is redirected to the Receiver device (PointRight is described by (i) Johanson et al, in U.S. patent application Ser. No. 10/821,685 filed Apr. 8, 2004 and (ii) Johanson et al, in U.S. patent application Ser. No. 11/345,609 filed Jan. 31, 2006, both of which are hereby incorporated by reference for all that they discloses). Dropping the thumbnail on the display of a Receiver device will initiate behavior analogous to dragging the Source thumbnail onto the Receiver thumbnail in the content channel organizer. In each of these examples, the effect is to appropriately direct the content of the channel to show on the Receiver display.

Users could access content menus in a system-dependent fashion for each thumbnail (right click on Windows, ctrl-click on Macintosh, etc.). These would allow the user to execute commands specific to the content represented by the thumbnail. For example, right-clicking on the thumbnail (see e.g. SwiftBlade example herein) for a person might give a choice of starting an instant messaging session with that person. For example, right-clicking on the thumbnail of a whiteboard capture device might provide for saving a snapshot image of the current whiteboard state. Similarly, selecting multiple thumbnails then right-clicking would apply the action to all of the thumbnails.

1.1 Digital Device Video Displays

Digital devices may include, but are not limited to, notebook computers, desktop computer workstations, projected computer systems, personal digital assistants, cell phones, digital media appliances, digital cameras, video cameras, and $2d$ or $3d$ scanners. The channel organizer allows the native video display associated with any of these devices, as a Receiver, to be linked to the display of another, Source, device such that it mirrors, i.e., copies, the content of the Source device. Again, multiple Receiver devices could mirror a single Source device simultaneously or multiple Source devices simultaneously. The content channel organizer includes the option to display the native content display of a device when it is not mirroring another.

In one mode, content is streamed from a particular Source channel to one or more Receiver channel displays associated with a particular person by dragging the thumbnail representation for the Source content channel onto the representation for that person. This can be similarly implemented for a group of people, in which case the content from the Source channel would be streamed individually or collectively to the devices or device associated with the individuals in the designated group.

In another mode, content is streamed from a particular Source channel to the meeting archive or notes associated with a particular person by dragging the thumbnail representation for the Source content channel onto the representation for the person. This can be similarly implemented for a group of people, in which case the content from the Source channel would be streamed individually or collectively to the meeting archive or notes associated with the individuals in the designated group.

As described above, content can also be dragged to or over the thumbnail representation of a Receiver. In the case of a digital device video display, the content is then transmitted and stored on the device associated with the Receiver, or, after transmission of the content to the Receiver, any of a number of other content specific actions may be performed.

1.2 Physical Input Device Content Representations

Physical input devices may include, but are not limited to, whiteboard capture systems, gesture interface systems, microphones, location sensors, manipulative computer interface devices, network-enabled furnishings, or video cameras.

The content channel organizer supports content streams from physical input devices that sense activity and transform the activity into some form of digital content. Appropriate viewer software represents these channels, providing both a thumbnail representation as well as a full-size application window to allow access to each channel. Content channels representing physical input device content are 'view only' unless there is a way to mirror changes to the electronic, captured, version of the data back to the physical device.

Even in the case of a "view only" physical input device channel, a user could create a new Content Window Display channel (see below), which is a "clone" of the physical input device channel. In the new channel, the user would be able to edit the copy of the physical input device channel at the time of the clone as appropriate to the nature of the content. For example, if the original content channel consisted of captured stroke information from a physical whiteboard, users would be able to add or delete strokes, change stroke colors, highlight areas of the resulting image, copy and paste segments of the image, or embed digital images and other content into the resulting graphic. In some cases, users can create channels, which support lesser subsets of editing capability, such as only allowing highlighting of the original content.

Content can also be redirected from a physical input device content channel in the same way as for digital device video displays. Moreover, content can be recorded from physical input device content channels in a similar fashion.

1.3 Content Window Displays

Content windows include the graphical user interface of a software application (which may or may not be associated with hardware peripherals, e.g. an digital interactive whiteboard system), a web-browser or plug-in handling information content, a viewer for a content appliance (e.g. web camera), or a third-party interface to either an underlying software application, database, or collection of aggregated or independent information sources.

Under one scenario, selecting a content window from the content channel organizer on a Receiver device initiates a streaming feed of the content window from the Source device to the Receiver device. This streaming feed will display an active copy of the application window on the Receiver display, but any interaction that takes place with the window on the Receiver device will affect the application running on the Source device. Effects of interactions made at either the Source or Receiver devices will be apparent to all devices connected to the streaming feed.

Alternately, selecting a content window may initiate a transfer of the viewer application, with or without content, from the Source device to the Receiver device. In this case, the window would close on the Source device.

A user can again drag and drop a content window onto a Receiver channel thumbnail in the content channel to initiate a streaming feed of the window to the Receiver display. This streaming feed will display an active copy of the application window on the Receiver display, but any interaction that takes place with the window on the Receiver device will affect the application running on the Source device.

A user can drag a digital file or other object onto the thumbnail representation of a Source content window in order to transmit a copy of that file or object to the Receiver and cause the Receiver to open the file or object.

In the case of content windows associated with input-only devices (e.g. video cameras, sensor systems, whiteboard capture systems), users will be able to perceive the content, interact with a digital copy of it, and/or create annotations or other augmentations to the digital copy of the content.

In the case of content windows where the content is inherently editable, interacting with and/or editing a copy of the data being shown in a viewer on any device would cause the interactions and editing to be reflected to every other device showing the same content window channel. For example, for an electronic whiteboard system, users viewing the electronic whiteboard content on any display will be able to interact with the content, adding strokes, pointing out material, etc.

1.3 Implementation

Devices and software applications originating and receiving content channels will be linked to an interactive room coordination infrastructure at each location. Infrastructures will then be linked between locations. The event-based architecture will pass coordination messages between devices and applications. Channels provided by any device connected to any of the linked locations will be broadcast to all other devices as long as they are available. Individual devices will keep track of broadcasts and the types of channels they support in order to provide the user of the device an accurate set of thumbnails of available channels. A pixel replication or graphical command interception technique will be used to provide a remote view of content across locations or devices. A file-transfer technique, coordinated with event-based meta-information transfer, launch commands and configuration parameters will be used to facilitate content transfer between locations and devices. Peer-to-peer and/or store-and-forward data handling techniques will be used to support content transfer.

2.1 Status Indicator on Channel Representation

The display or other output mechanism of a device provides an indication of its current state regarding channel access. Specifically it may indicate information that includes, but is not limited to, the following:

Which channel is currently being displayed

Whether channel is being mirrored

Whether channel is mirroring another channel

Whether channel is in default configuration (i.e. output from its native device)

Which users are monitoring channel through a mirror channel or directly

Level of input activity on the channel, or last active input to the channel

Whether content has been saved to a meeting archive

Whether it is replaying captured views from real-time stream

Channel status information may also be indicated via devices that are not reproducing the channel content. For instance, indicator lights mounted within the room might show levels of activity on selected channels without carrying the information being transmitted on those channels.

2.2 Implementation

The system could maintain state information regarding the status of each channel, each user's channel selections, and the relationship of channels to the recorded archive. User interface components could access this state information and reflect it in either a component embedded within the channel view, or else in a separate software object. Alternately, the system may communicate the state information to output devices that reveal only meta-information about state rather than channel content. These may be tied to the system via a networked event coordination infrastructure. The system may provide graphical, audible, or tactile indicators of channel status, or some combination of these.

3.1 Aggregate Information from Networked "Perceptors"

Perceptors are any software agents, input devices, or physical sensor systems that provide real-time or historical meta-information including, but not limited to:

Indication of device interaction activity

Real-time business information from networked sources

Physical sensor data

Perceptors are able to provide meta-information corresponding to any of the channels shown in the content channel organizer. For example, a software agent perceptor might indicate how many users are monitoring each content channel and provide a numerical indicator for each. An input device perceptor might monitor who is typing input on a particular content window or drawing on a captured whiteboard and provide that information to the thumbnail representation for the corresponding channel. A physical sensor might indicate when someone enters a room, which screen users in a room are attending to, whether someone is standing in front of a large display screen during a meeting.

Information generated by perceptors is integrated into the content organizer and/or other applications to provide greater activity awareness across devices, users, and locations.

3.2 Implementation

Embedded physical sensors connected to the network and software agents running on networked devices could monitor relevant activity phenomena and generate events that could be sent via an interactive room coordination infrastructure. User interface components could receive relevant events from the infrastructure and generate appropriate visuals or other output responses to communicate information to users.

4.1 Channel Security Model

Security policies for the system could be configurable per channel, per device, per person, per application, per object, or per interactive workspace in case there are multiple interactive workspaces involved.

Security policies regulate the nature of allowable interaction, to include but not be limited to: modify original, modify copy, read original only, unavailable, hidden. Security policies differentiate content access, determining whether users can pull content from a channel, save content on their own device(s), push content to a channel in a public way, or transfer content between locations. A user can encrypt any of the content channels so that they can be securely accessed across the network. A user can also protect meta-information about interaction activity from others who are not authorized to access it.

4.2 Implementation

Actions handled through an event coordination infrastructure could be tagged with cryptographically verifiable identity information indicating the source user, device and application as well as the requesting user, device, and application. Policies set in place as part of the infrastructure system could manage permissions and allow or disallow actions according to policy rules. Further, certain users may be granted permission to dynamically change permissions during the course of normal interaction in the workspace (for example, a private user on a laptop may choose to make his local desktop display temporarily visible to others). UI elements may provide indications of permission status as dictated by the policies. In addition, alert messages may be provided when an action is disallowed.

5.1 Channel Linkage to External Components and/or Applications

The content channel management system makes usage information and associated content available to other authorized systems and applications connected to the common coordination infrastructure. This capability allows such components and applications to:

(i) Monitor information usage within the meeting to generate meta-information such as, but not limited to, information access metrics, real-time feedback indicators regarding group interaction, or average usage statistics for particular content channels.

(ii) Provide user assistance based on context awareness across devices and users. For example, a software assistant application might provide an indication of other users who are monitoring a particular content channel and allow them to send text messages to one another to discuss the information.

(iii) Allow users to send files and other digital objects to devices or attendees via email, file transfer, voicemail, or other external mechanisms.

(iv) Allow users to save a snapshot of a channel's content at a moment in time, either as a full-screen capture or a selectable region capture, and save it to a group or individual repository. The system will provide a capability for taking a snapshot representation of the content shown in one or more channels at a moment in time. The snapshot could provide a grouping of all content channels shown on a particular device, all content originating from a particular device or some collection of channels specifically designated in some way as a part of a group.

(v) Allow a software agent to track files, objects, and/or information that flow across channels and save copies of these, as well as meta-information regarding source, destination, and transfer time, to an archive.

(vi) Provide a "digital onion skin" that could allow users to markup snapshots of channel content without affecting the underlying information. Users are also able to make markings directly on real-time information stream with markings that would fade away after a pre-determined timeout (or have an override capability).

5.2 Implementation

The system provides content management mechanisms that could allow external applications to import streaming content from the channels. Rather than creating separate copies of content already saved to the archive, external applications will be able to reference to the original content and synchronize any overlaid information (e.g. annotation markings, voice-overs, related text messages, hyperlinks) with the underlying content for presentation purposes. Applications will be able to extract portions of the archived content to create new digital artifacts as necessary.

External applications are able to collect and/or aggregate meta-information from the coordination infrastructure either in real-time or asynchronously to provide feedback and coordination information for users, applications, and software agents.

6.1 Flexible Customizable Channel Representations

Users can customize channel representations in the content channel organizer. Users may, for example, collect multiple channels as a cluster, reducing them in size and aggregating their meta-information indicators to reflect properties of the collection as a whole. In such a case, individual thumbnail representations might change in some way, for example reducing in size and/or manifesting as an outline view only.

Users may configure their system so that if they hover over a particular thumbnail, it will grow in size so that its content and/or meta-information indictors are more easily read.

Alternately, hovering over a thumbnail may activate it to show a real-time representation of the content while other thumbnails remain in a static view mode or maintain a slower refresh rate.

Users can manage properties of channels when they highlight the corresponding thumbnail. The mechanism for accessing the properties menu might consist of, but is not limited to, using a right-click mouse action or hovering over a region below the thumbnail that will then trigger a properties control window viewer.

When expanded, channel representations may either manifest themselves as detachable views or as elements contained within the channel content organizer.

A channel associated with a user may be highlighted in some way as they speak, for example by changing the color of its border.

Users can configure channels so that particular events relative to channel(s) trigger indicators on other devices or output systems in the physical space.

6.2 Implementation

Implementation of these aspects of the system includes developing user interface components that respond to state and event information passed through the interactive room coordination infrastructure. Where users customize their interface, state information on the user interface properties will be preserved and channel representation elements will respond accordingly. Where the customization comes in response to dynamic activities, representations will adapt in an ad hoc manner to events they receive through the coordination infrastructure.

7.1 Channel Bar Implementation—SwiftBlade

An example of the channel bar implementation is now described according to an embodiment referred to as SwiftBlade. The following description contains further details of the above-described concepts as well as additional concepts, which are all considered within the scope of the invention. In particular, the channel bar portion of SwiftBlade is further described, which can be divided into the following two parts: (a) controller, and (b) user interface (UI).

The controller includes code that runs behind the scenes and handles coordination of the system across the multiple machines in one or more interactive workspaces. For the channel bar, the controller tracks available channels and handles "tuning" the local display to show channels selected by the user. The user interface (UI) includes code that renders a set of control widgets and icons representing channels as a graphical user interface and handles user interactions with this interface. It sends messages back and forth to the controller, which does most of the work. For the Channel Bar, a list of available channels is received from the controller and rendered as icons with which the user can interact. Based on interactions with the icons, the UI sends messages back to the controller indicating new channels selected for viewing, etc. The following sections describe the controller and UI parts in more details.

7.2—SwiftBlade—Controller

The controller has been implemented in Java as a set of classes, which are instantiated in a running Channel Bar controller. The classes rely on the existence of a broadcast communication medium shared by all machines in the interactive workspace that are participating in the channel system. In the particular example, the Event Heap coordination system serves this purpose (EventHeap is described by Johanson et al. in U.S. patent application Ser. No. 10/821,756 filed Apr. 8, 2004 and is hereby incorporated by reference for all that it discloses). For multiple interactive workspaces, it is assumed that the broadcast mechanism's scope is increased such that machines in all participating interactive workspaces are able to communicate with one another through the medium. This could be done, for example, by creating a "bridge" which forwards all traffic from any given interactive workspace's communication space to all other interactive workspace's communication spaces when more than one interactive workspace are joined together.

As implemented for the SwiftBlade example, the controller includes the following classes:

DisplayChannel Class: There is one DisplayChannel object per machine that participates in the Channel Bar system. It keeps track of the channels available in the connected interactive workspaces through monitoring the broadcast medium for announcements of channel availability. It sends messages to the UI to display the available channels, and also handles setting the local display to show a channel when the user chooses to "tune" into a channel through via the UI. It also makes available the local machines desktop as a special channel that other machines in the connected interactive workspaces can choose to display.

ChannelServer Class: Each channel that is made available in the interactive workspaces has a ChannelServer object that indicates the channels availability to other machines in the interactive workspaces through the broadcast medium. Announcements from these ChannelServer objects are received by the DisplayChannel objects on each machine, which in turn insure the channel is displayed to the user on that machine.

ChannelViewer Interface: Each type of channel must have a ChannelViewer object that can render the content of that channel type on a machine, which "tunes" into a channel of that type. For any given machine, users won't be given access to a channel unless a ChannelViewer for that channel type is available.

AppCluster Class: This class is responsible for getting the entire SwiftBlade prototype, including the Channel Bar pieces, up and running. It reads an XML file which specifies which different modules need to be initiated and loaded. With regards to the Channel Bar, the mechanism is particularly useful since new ChannelViewer implementations can be added into the XML file after initial software deployment. Once added, the type of channel supported by that viewer will become visible/available in the Channel Bar on that machine when the SwiftBlade is next run.

The remainder of this section describes the function and implementation of each class in the Channel Bar controller implementation.

7.2.1—SwiftBlade—DisplayChannel

A DisplayChannel object is instantiated on every machine participating in the channel bar system. It serves several different purposes:

It tracks available channels in the connected interactive workspaces and relays that information to the UI, which displays the channels to the user.

It serves as a ChannelServer, making the local machine's display/desktop available as a channel in the connected interactive workspaces.

It serves as a ChannelViewer when the user requests to tune to the contents of some other machine's display (as advertised by that remote DisplayChannel object).

Serving as Manager of Available Channels

In its' role as tracker of available channels, a DisplayChannel object subscribes to beacons sent through the broadcast medium by ChannelServers and makes that information available to the UI so that it can show icons for all the different channels in the space. This includes refreshing the UI as channels become available, change state, or disappear. Note that only channels for which an appropriate ChannelViewer is available on the local machine are passed along to the UI for display to the user.

A special non-beaconed "channel" is always made available which represents the user's own local desktop. When selected all other channel viewers are hidden so that the user can see whatever windows and applications are being displayed on the desktop of the local machine.

User selections of channels to be "tuned" on the local machine trigger a message from the UI indicating the selected channel. When this happens, the DisplayChannel sends a "show" command to the viewer that handles that channel's channel type. For "display" type channels, it handles the request itself (see below for details). For requests to "tune" the machines own desktop, it simply hides any running viewers for a different channel.

As different channels are "tuned" the ChannelServer aspect of the DisplayChannel is updated to beacon the name of the tuned channel so that any remote machines tuned to this "display" channel can update themselves to show the new channel.

In addition, as a channel manager, the DisplayChannel object receives messages from the UI whenever a user drag-and-drops content onto an icon representing some channel that is available in the interactive workspace or workspaces. When these messages are received, a request to "handle" that content is forwarded out over the broadcast medium so that the ChannelServer for that channel can do the appropriate thing with the request.

Serving as a ChannelServer for the Local Display

In its' role as a ChannelServer, the DisplayChannel beacons itself over the broadcast medium as a channel along with the current channel it is displaying. This latter information allows remote DisplayChannel objects that are viewing/tuned to the local display channel to keep themselves tuned to the same channel as this display, enabling them to "follow along" as the user views other channels. There is a special channel type called "LocalDesktop" which indicates that currently no specific channel is "tuned" on the local display, and thus it is just displaying whatever applications are displayed on the desktop of the local machine. When this channel is "active", remote machines "tuned" to the channel for this display will connect to the local machine for remote desktop sharing.

Also in its role as a ChannelServer, any "handle content" request that is received for this display's channel over the broadcast medium causes the local display to be automatically set to the machine's own desktop, i.e. the "LocalDesktop" channel. The content is then opened using the appropriate application (e.g. web browser, image viewer, word processor, etc.).

Serving as a ChannelViewer for "Display" Type Channel

When a message is received from the UI indicating that the user would like to "tune" to a "display" channel for a remote machine, the local DisplayChannel object serves as a ChannelViewer to display that channel. In this case, the DisplayChannel object determines what channel is showing on the remote display, and then calls the show method on the local viewer for that channel and its type.

If the tuned remote "display" channel is showing it's own desktop, the local DisplayChannel object launches a remote desktop viewer to show the remote desktop on the local machine.

When the "display" channel being viewed is itself "tuned" to another "display" channel the software looks up what channel is being shown on that third "display," then launches the appropriate local viewer. If the third display is also "tuned" to a "display" channel, the dereferencing continues until a non-display channel is found. If at any time in this dereferencing process the channel to be displayed is found to be the local display channel, the local display reverts to its own desktop to avoid creating a loop.

The DisplayChannel also continuously monitors changes to the channel being displayed on the remote display to which it is tuned, and updates its own display appropriately using the methods described above.

7.2.2—SwiftBlade—ChannelServer

The ChannelServer class is instantiated by every native source that wishes to provide its content to other devices in the connected interactive workspace or workspaces. For example, a whiteboard capture application might instantiate a ChannelServer object to indicate that other machines can "tune" to its channel to see the state of the whiteboard it is capturing.

Once a ChannelServer class is instantiated, it "beacons" its availability every few seconds by sending an announcement out over the broadcast medium. These beacons include the following information:

Unique short name for the channel, which is used as a reference by the controller and UI code;

Long name for the channel, which is displayed to the user in the UI;

Channel Type (e.g. physical whiteboard, desktop, etc.), which is used to select the appropriate viewer; and/or One or more channel specific parameters which are need by viewers to connect to and display the channel (e.g. server contact information for that channel, or for a "display" channel, what channel that display is currently showing).

The channel specific parameters can be updated by the source of the channel at any time. These changes will propagate out when the next beacon is sent. This change in content is detected by the DisplayChannel objects and viewers showing the channel and used to modify how the channel is being showed.

ChannelServer objects also listen for events sent over the broadcast medium, which encode "content" requested to be handled by the source of the channel. These events would typically be generated by a user dragging-and-dropping content, such as a file, onto a representation of the channel in the Channel Bar UI. Received content is handled in a channel-type-specific manner (e.g. an image dragged to a "desktop" channel might be opened in the image viewer on that screen, while an image dragged to an "electronic whiteboard" channel might be incorporated as an object in the whiteboard sketch).

7.2.3—SwiftBlade—ChannelViewer

To allow a channel to be shown on the local display, the DisplayChannel uses a ChannelViewer object. Each ChannelViewer object can display a channel of one or more given types. The ChannelViewer itself is an interface, which must be implemented by a class that will act as a ChannelViewer.

Any ChannelViewer must implement a method, which accepts a copy of the beacon information from a ChannelServer and then causes that channels content to be shown on the local display. A DisplayChannel object makes a channel visible on the local display by calling this method when it receives a message from the UI indicating a user has requested to have that channel "tuned" on the local display.

A ChannelViewer must also implement a method, which causes it to hide itself and the channel it is displaying. Hiding a ChannelViewer will reveal whatever other windows happen to be showing on the desktop of the machine on which the channel viewer is running. If the ChannelViewer is being told to hide the current channel because a new remote channel has been selected to be shown on the local display, after calling hide on the active ChannelViewer, the DisplayChannel must call the show method on a different ChannelViewer to cause it to display the new channel.

In the SwiftBlade implementation of the system, a class called CommandLineViewer which implements ChannelViewer was created. It is a generic channel viewer application that will run a command line when requested to display a channel. The command line gets substituted with parameters from the ChannelServer beacon for the channel it is being told to display. At instantiation, the type of channel the CommandLineViewer will handle is specified along with the command line to use when viewing the channel. Using the CommandLineViewer class, many different channel types can be supported as long as there are existing command line applications for viewing the content provided by that channel type.

7.2.4—SwiftBlade—AppCluster

The AppCluster class is one of the first classes instantiated when the SwiftBlade implementation is started. It parses an XML file, which contains a list of modules that will run as part of the application. These modules are divided into senders, receivers, and components. The former two are modules that participate in internal communication within SwiftBlade, including communication to the UI. The latter can be any object that should be running when SwiftBlade is active.

In particular for the ChannelBar, these components can specify Java classes that implement the ChannelViewer interface, and thereby provide the capability of "tuning" channels with the channel type that they support for a given installation of the SwiftBlade prototype. The following is an example block that specifies a viewer for "RemoteDesktop" type channels:

```
<!-- Viewer for remote desktops. -->
<component name="RemoteDesktopViewer"
    classname="com.tidebreak.distributed.CommandLineViewer"
    args="RemoteDesktop "./bin/vncviewer.exe %VNCServer%
/autoscaling /shared /nostatus /notoolbar /password swiftblade""/>
```

The "name" attribute specifies that the viewer will be called "RemoteDesktop Viewer"—this is used to reference the viewer within the running application. The "classname" attribute specifies the Java class that should be loaded and instantiated to create this component/viewer. This class must implement a specific interface called AppClusterComponent that allows the object to be instantiated by the AppCluster code. In this example, the CommandLineViewer class, discussed in the ChannelViewer section, is being created. The final "args" attribute is a string containing parameters to be passed to the component/viewer when it is instantiated. The meaning of these parameters is class specific. In the case of the CommandLineViewer class, the first parameter in the string indicates what channel type it can display, in this case "RemoteDesktop", and the second parameter indicates the command line to execute in order to view the given channel. In this case a command to launch a vncviewer.exe program, which will display a remote desktop, is used. Note that in the case of this viewer, the % VNCServer % parameter gets substituted with the IP address of the remote desktop by the CommandLineViewer application based on the specific RemoteDesktop channel being viewed (see the ChannelViewer section for details on this).

Once viewers/components have been loaded, the DisplayChannel class queries the local AppCluster agent for available components, and then, for each component, checks to see if it is a ChannelViewer, and, if so, what channel type the viewer supports. For a given channel being beaconed through the broadcast medium, the DisplayChannel will only make that channel available to the user through the UI if its channel type is present in the set of all channel types supported by ChannelViewers instantiated as components in the AppCluster.

Since the viewers present in the AppCluster are not hard coded, support for new channel types can be added to any given installation of SwiftBlade by simply adding a new block of text for the viewer to the XML file defining the components for that installation, adding a Java Jar or class file that implements that viewer on the machine with the installation, and then modifying the SwiftBlade prototype's classpath to include the new code. The next time the SwiftBlade prototype is started it will then automatically support the new channel type, and all channels of that type will become available in the channel bar on that machine.

7.3—SwiftBlade—User Interface

Figure 3:
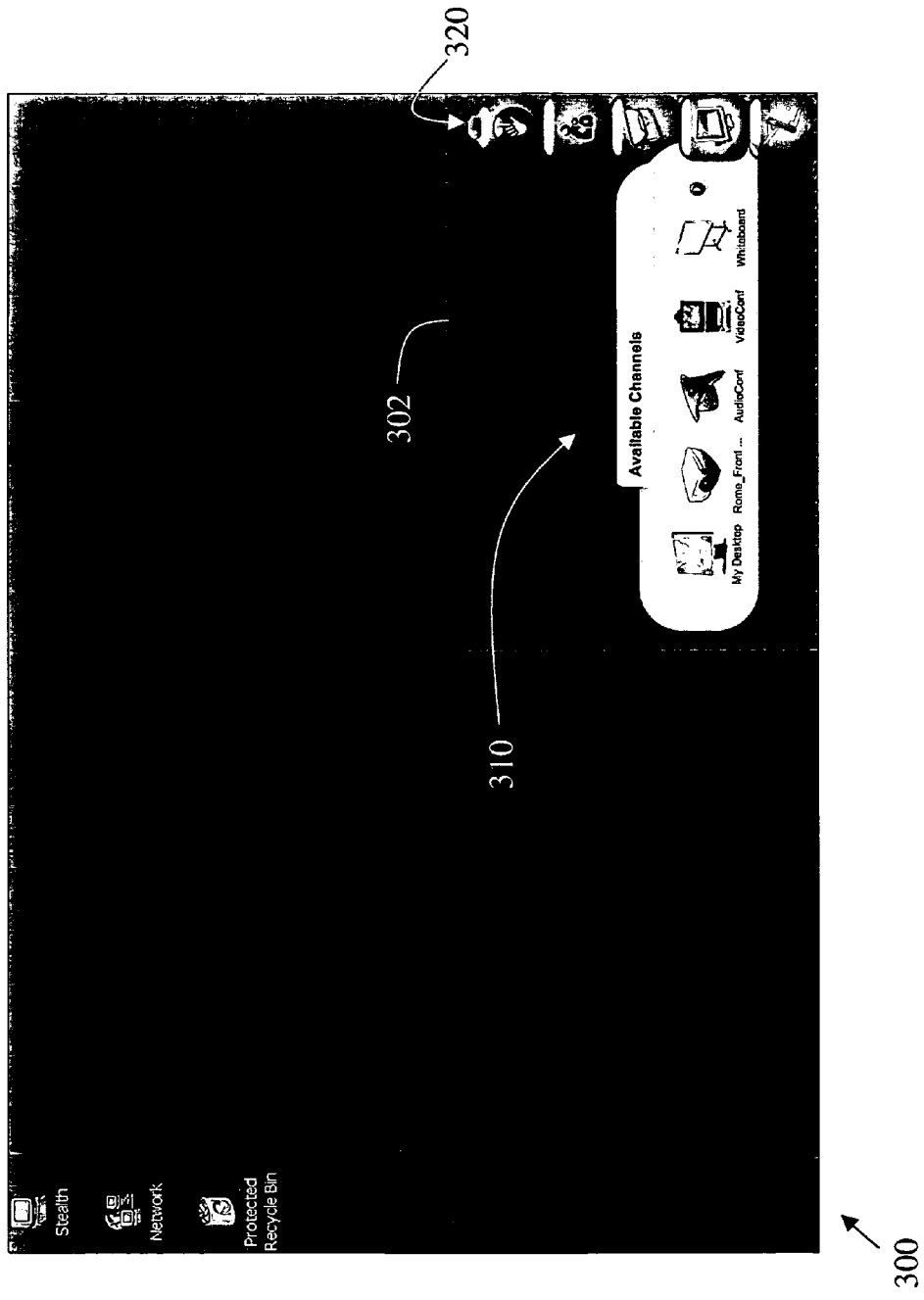
FIGS. 3-4 show actual screenshots (300 with expanded view 302) of a computer implementing the content channel bar/manager/organizer 310 according to an embodiment of the present invention. It is noted that the channel bar 310 represents at least two different and unique channels each having one of a plurality of different channel types. In the particular example, channel 310A is desktop-type channel representing the users local desktop and labeled "My Desktop", channel 310B is a display-type channel labeled Rome_Front, channel 310C is an audio-type channel labeled "Audio-Conf", channel 310D is a video-type channel labeled "VideoConf" and channel 310E is a physical-whiteboard-capture-type channel labeled "WhiteBoard". It is noted that the example of the display-type channel Rome_Front is of the channel type where the channel dereferencing/following applies as described herein.
Figure 4:
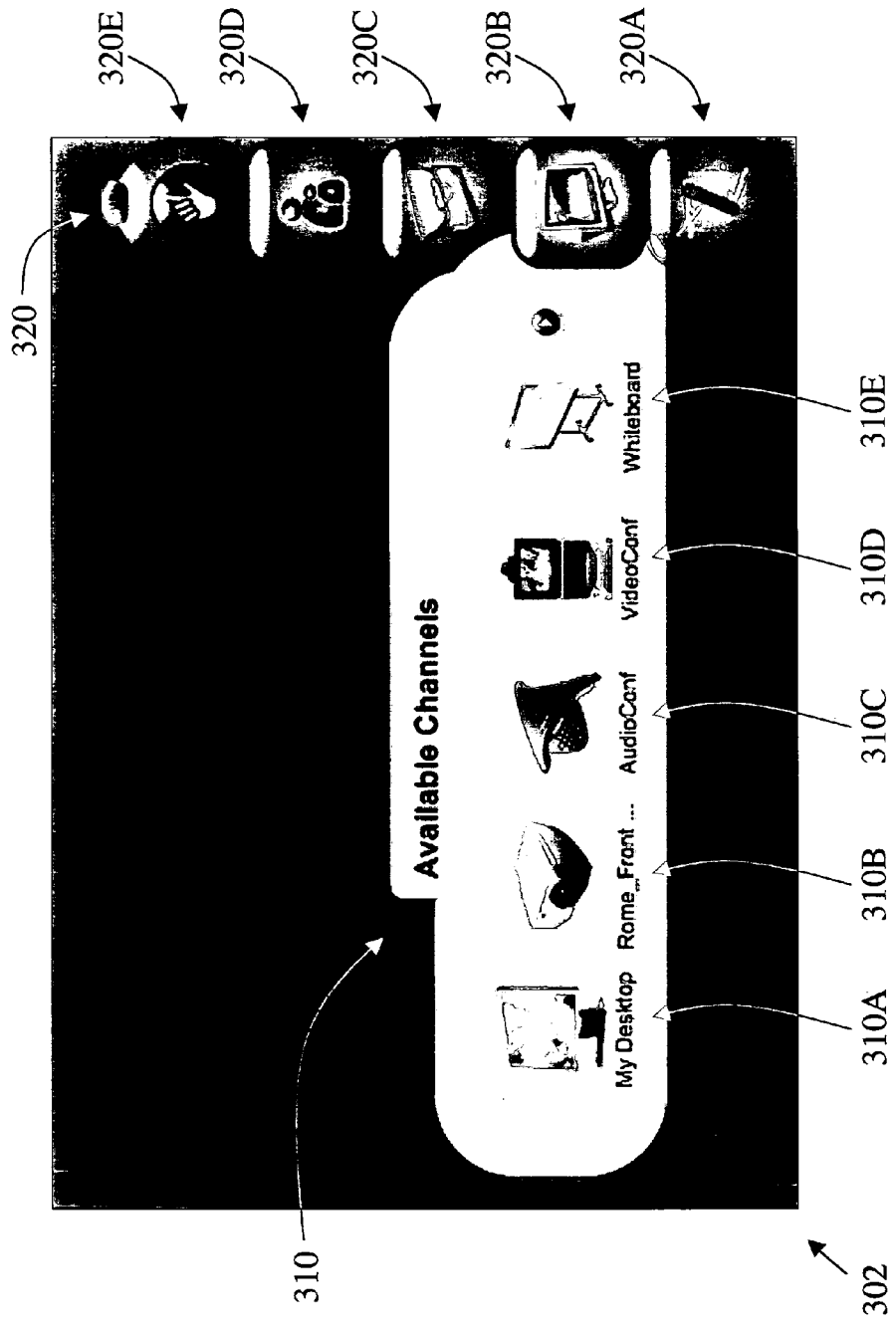

The User Interface (UI) for the SwiftBlade was implemented as a Konfabulator widget, which uses Javascript to code functionality. The UI is responsible for displaying available channels as icons and allowing users to interact with them to select channels for viewing, etc. FIGS. 3-4 give examples of what the UI looks like. It includes primarily an icon for each available channel with which a user can interact to control which channel is being viewed on the local screen. User may also drag content to a channel's icon for a channel to have that channel do something with the content.

7.4—SwiftBlade—Operation

At the system start, the UI sends a "Session:RequestState" message to the Controller. The Controller responds by returning an "EventNotifyChannelInfo" message containing information about the channel from the ChannelServer beacon. Upon receiving the event, the Channel Bar code creates representative Channel Objects for each available channel. These objects hold the definition information as well as the appropriate icon.

During normal system operation, the Controller will periodically send new "EventNotifyChannelInfo" messages, especially when one or more channels change status or availability. For example, a screen in a remote facility could come online when the facility is joined to the meeting, and go offline when the facility is removed from the meeting. The Channel Bar code will update each Channel Object with the revised information, create new Channel Objects as needed and prune away any missing channels, thus ensuring that the Channel Bar displayed for the user always shows the most accurate channel status.

The user can select a channel for viewing by double-clicking its icon or by selecting "Open Channel" from the icon's popup menu. In the user interface model of this particular embodiment, there is no "Close Channel" command, but one could be included if desired. One closes channels by simply opening new ones, like pushing buttons on a car radio. To close all the channels, the user selects the "Local Desktop" channel; selecting this channel closes any open channel without opening a new one.

UI events for opening a channel are received from the window manager by the appropriate Channel Object. The object's code issues a "Channel:Set" message to the Controller, passing the short name of the channel. On the controller side the DisplayChannel object handles opening the appropriate viewer to display the channel. Since the Controller manages the actual channel viewers, the GUI does not need to first send close Actions to the currently open channel viewer.

Users can also transfer files, URLs or other resources to channel devices by dragging and dropping them on the channel icon. This is useful, for example, if one wishes to, say, annotate a document using a digital whiteboard. Dragging and dropping URLs from the address bar of a browser typically causes the web page to be opened on the channel device.

When the user drops a file, URL or other resource on a channel icon, the appropriate Channel Object receives a UI event from the window manager containing the URI (Uniform Resource Identifier) of the resource. For a file, this is typically a full path to the file, while for a URL this is typically the URL itself. The Channel Object issues a "Channel: HandleContent" message to the Controller, passing the URI. The Controller is then responsible for passing the URI on as content to be handled by the appropriate ChannelServer object.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed is:

1. In one or more interactive workspaces characterized by multiple users, multiple independent visual displays, a plurality of different channels each having one of a plurality of different channel types, a network connecting said multiple independent visual displays and said plurality of different channels, and wherein each channel represents some static or dynamic content which corresponds with said channel's type, a method of organizing and redirecting content in said one or more interactive workspaces, said method comprising:

(a) displaying a content channel bar on at least two of said multiple independent visual displays referred to as a primary displays, wherein said content channel bar contains multiple unique representations of said plurality of different channels available in said one or more interactive workspaces, wherein said different channels and said primary displays are linked through said network, wherein said plurality of channels comprise:

(i) at least one channel corresponding to the content of the channel currently being displayed on another of said visual displays referred to as a secondary display; and (ii) at least one channel for providing direct access to view and modify a shared data representation running on a separate machine, (b) selecting a desired channel from said plurality of different channels in said channel bar by selecting one of said unique representations from said channel bar that represents said desired channel; and (c) directly viewing on said primary display the content represented by said selected unique representation and channel in a manner appropriate for the channel's type, wherein said selection of said unique representation of said secondary display changes the displayed content on said primary display to be the same content in the same visual format as the displayed content on said secondary display, wherein said selection of said shared data representation displays a view of said shared data on said primary display, and wherein interactions with said view on said primary display can affect said shared data representation running on said separate machine, wherein said secondary display itself has a channel bar, referred to as a second channel bar, representing a plurality of different channels with a plurality of different channel types, wherein said channels of said second channel bar are selectable, wherein said selection of one of said channels of said second channel bar changes said displayed content on said secondary display, and wherein one of said channels of said second channel bar is selected on said secondary display, said secondary display is displaying content from said selected channel of said second channel bar, and wherein said selection of said unique representation of said secondary display from said channel bar on said primary display allows said primary display to directly view and directly access said selected channel being displayed on said second display despite the fact that the selected channel from said second channel bar was not selected from said primary channel bar on said primary display.

2. The method as set forth in claim 1, further comprising discovering a newly available channel in said interactive workspace and adding a unique representation for said newly available channel automatically to said channel bar if said newly available channel has a known channel type.

3. The method as set forth in claim 1, further comprising adding to said channel bars a viewer module or library supporting a formerly unknown channel type, thereby providing the display of unique representations for channels of said formerly unknown channel type in the channel bar, and allowing the selection and viewing of said channels.

4. The method as set forth in claim 1, wherein at least one of said unique representations in said content channel bar is updated with real-time views of the respective content corresponding to the channel in said interactive workspace with the respective unique representation.

5. The method as set forth in claim 1, wherein one or more of said plurality of unique representations is a thumbnail.

6. The method as set forth in claim 1, wherein one or more of said plurality of unique representations comprises menu options.

7. The method as set forth in claim 1, further comprising indicating channel status information for one or more of the content channels in said content channel bar.

8. The method as set forth in claim 1, further comprising indicating meta-information for one or more of the content channels in said content channel bar.

9. The method as set forth in claim 1, further comprising dragging and dropping an object or file onto one of the unique representations, after which said dropped object or file is handled by the content source of the respective content channel in a manner appropriate to that channel type.

10. The method as set forth in claim 1, further comprising adding security policies to said interactive workspace controlling access and interaction between one or more of said available channels, one or more of the users, or one or more files or objects available in said interactive workspace.

11. The method as set forth in claim 1, further comprising adding information to one of said unique representations without affecting the respective content of the channel corresponding to that unique representation.

12. The method as set forth in claim 1, wherein said selection of said unique representation of said secondary display changes the displayed content on said primary display to be the same content in the same visual format as the displayed content on said secondary display, wherein the displayed content on said primary display can be edited on said primary display, and wherein said edits are displayed on said primary and said secondary displays.

13. The method as set forth in claim 1, wherein a number of other intervening display channels are between said secondary display and an ultimate target channel being displayed on said secondary display due to selection of said ultimate target channel from said second channel bar, and wherein said selection of said unique representation of said secondary display from said channel bar on said primary display allows said primary display to directly access said ultimate target channel being displayed on said secondary display.

* * * * *